(12) United States Patent
Natsume et al.

(10) Patent No.: US 7,431,638 B2
(45) Date of Patent: Oct. 7, 2008

(54) AIR PASSAGEWAY OPENING/CLOSING DEVICE

(75) Inventors: Takuya Natsume, Kariya (JP); Kazushi Shikata, Kariya (JP)

(73) Assignee: Denso Corporation, Kariya (JP)

( * ) Notice: Subject to any disclaimer, the term of this patent is extended or adjusted under 35 U.S.C. 154(b) by 75 days.

(21) Appl. No.: 11/223,598

(22) Filed: Sep. 9, 2005

(65) Prior Publication Data

US 2006/0057953 A1 Mar. 16, 2006

(30) Foreign Application Priority Data

Sep. 13, 2004 (JP) .............................. 2004-265325

(51) Int. Cl.
B60H 1/00 (2006.01)
F24F 7/007 (2006.01)
F24F 13/12 (2006.01)

(52) U.S. Cl. .................... 454/121; 454/69; 454/156; 454/160; 454/324; 251/212; 137/614.11

(58) Field of Classification Search ................. 454/121, 454/156, 159, 160, 161, 69, 324; 251/212; 137/614.11
See application file for complete search history.

(56) References Cited

U.S. PATENT DOCUMENTS

| | | | | |
|---|---|---|---|---|
| 3,068,891 A | * | 12/1962 | Panning et al. ............... 137/499 |
| 3,147,768 A | * | 9/1964 | Kennedy ................ 137/614.11 |
| 3,396,904 A | * | 8/1968 | Janette ......................... 251/78 |
| 3,672,293 A | * | 6/1972 | Gona et al. .................. 454/313 |
| 3,880,402 A | * | 4/1975 | Fleischer ..................... 251/212 |
| 4,258,616 A | * | 3/1981 | Zeller et al. ................. 454/303 |
| 4,334,552 A | * | 6/1982 | Blanchard .............. 137/625.48 |
| 4,558,718 A | * | 12/1985 | Garfield ................. 137/614.11 |
| 4,653,385 A | * | 3/1987 | Ito et al. ..................... 454/313 |
| 4,739,924 A | * | 4/1988 | Kelley ........................ 236/49.1 |
| 4,852,639 A | * | 8/1989 | Horiguchi et al. ............. 165/42 |
| 5,218,998 A | * | 6/1993 | Bakken et al. ......... 137/625.28 |
| 5,490,395 A | | 2/1996 | Williams et al. |
| 5,507,547 A | | 4/1996 | Hattass et al. |
| 5,551,667 A | * | 9/1996 | Galka et al. ................. 251/212 |
| 5,596,966 A | * | 1/1997 | Elder .......................... 123/337 |
| 5,653,630 A | * | 8/1997 | Higashihara ................ 454/121 |
| 5,663,630 A | | 9/1997 | Koziatek |
| 6,431,257 B1 | * | 8/2002 | Sano et al. ..................... 165/42 |
| 6,588,495 B2 | | 7/2003 | Ito et al. |

(Continued)

FOREIGN PATENT DOCUMENTS

EP 0616179 A1 9/1994

Primary Examiner—Steven B. McAllister
Assistant Examiner—Patrick F. O'Reilly, III
(74) Attorney, Agent, or Firm—Harness, Dickey & Pierce, PLC (57) ABSTRACT

An air passageway opening/closing device provided with a plurality of sheet members provided with openings and passageway blocking parts located at the two sides of these openings, wherein the lengths in a direction of door movement of the openings differ by predetermined amounts, when an adjacent smaller sheet member moves in the direction of door movement by a predetermined amount, the smaller sheet member and the adjacent larger sheet member move together, the opening ranges of two air passageways are determined by a position of movement of an opening of the smallest sheet member to which a driving force is added, and the blocking ranges of two air passageways are determined by superposition of the passageway blocking parts of the plurality of sheet members in a stepwise offset state.

12 Claims, 6 Drawing Sheets

U.S. PATENT DOCUMENTS 6,669,549 B2 12/2003 Uemura et al.
2004/0198214 A1* 10/2004 Karidis et al. ............... 454/186
2005/0000574 A1* 1/2005 MacGregor et al. ...... 137/625.3
2005/0048910 A1* 3/2005 Lindner ..................... 454/334

* cited by examiner

AIR PASSAGEWAY OPENING/CLOSING DEVICE

BACKGROUND OF THE INVENTION

1. Field of the Invention

The present invention relates to an air passageway opening/closing device for opening/closing two adjacent air passageways by a door means and is suitable for use for an automotive air-conditioning system.

2. Description of the Related Art

Conventionally, an air passageway opening/closing device in an automotive air-conditioning system was structured using a rotary door, integral with a shaft, comprised of a plate door rotatable about the shaft or a door surface comprised of an arc shape or flat shape at a position a predetermined distance from the shaft outward in the radial direction so as to open/close the air passageways by a rotational operation of the door around the shaft.

However, in this related art, it is necessary to provide space for the rotational operation of the door inside a casing of the air-conditioning system. Therefore, the size of the air-conditioning system inevitably becomes larger.

In the past, in this regard, a structure moving flat sliding door in a direction intersecting the flow of air of an air passageway so as to open/close the air passageway has been known.

With this flat sliding door, the door moves along an end face of an opening of the air passageway in a direction intersecting the air flow, therefore space for rotational operation of the door becomes unnecessary and the air-conditioning system can be made smaller in size.

However, when using this flat sliding door to simultaneously open two adjacent air passageways, the flat sliding door is inevitably operated to a position close to the center of the two adjacent air passageways to thereby form openings of the two adjacent air passageways at both the front and rear of the direction of movement of the sliding door.

As a result, the air in the casing of the air-conditioning system flows to the two air passageways split largely by the length of the sliding door at the sides at the front and rear-of the direction of movement of the door. For this reason, in an air mix type air-conditioning system or other such system adjusting the temperature of the air blown into the cabin according to the ratio of the amount of the cool air and warm air, the phenomenon arises that the cool air mainly flows to one of the two air passageways, while the warm air mainly flows to the other side of the two air passageways (phenomenon of separation of cool air and warm air), so control of the temperature of the air blown from the two air passageways becomes difficult.

Related art for solving this inconvenience are proposed in U.S. Pat. No. 5,663,630 and U.S. Pat. No. 6,669,549. U.S. Pat. No. 5,653,630 uses a film door constructed by a plastic film member having flexibility. An opening for opening an air passageway is arranged at an intermediate portion in the direction of door movement in the film member forming the film door. The film parts at the front and rear sides of this opening closes the air passageway.

The two ends of the film door in the direction of movement are connected to takeup shafts. By turning the two takeup shafts to tandem, the opening and the film parts of the film door are moved in a direction intersecting the flow of air to open and close the air passageway.

According to U.S. Pat. No. 5,653,630, when simultaneously opening two adjacent air passageways, the opening at the intermediate position of the film door is aligned with the openings of the two air passageways. Therefore, the air in the casing passes through the opening of this film door and flows into the two air passageways. For this reason, the phenomenon of separation of the cool air and warm air does not occur, and the temperature controllability of the air is good.

U.S. Pat. No. 6,669,549 uses a flexible sliding door comprised of a frame shaped part forming an opening for opening an air passageway arranged at an intermediate position in the direction of door movement and flexible film members for closing the air passageway arranged at the two front and rear sides of this frame shaped part.

In this flexible sliding door, the air passageway is opened/closed by connecting a door operating mechanism to the frame shaped part, imparting a door operating force to the frame shaped part, and moving the frame shaped part and the flexible film members in a direction intersecting the flow of air.

In U.S. Pat. No. 6,669,549, the air can be sent into two air passageways through the opening of the frame shaped part in the same way as U.S. Pat. No. 5,653,630, therefore the temperature controllability of the air is good in the same way as in U.S. Pat. No. 5,653,630.

However, in U.S. Pat. No. 5,653,630, the rotation mechanism for the two takeup shafts for taking up and releasing the two ends of the film door in the movement direction is complex, therefore there is the problem that production costs become high.

Also, in U.S. Pat. No. 6,669,549, since flexible film members having large enough sizes to fully close the opening of the air passageway are arranged at the two front and rear sides of the frame shaped part, it is necessary to provide enough space for accommodating the front and rear side flexible film members in the casing of the air-conditioning system. The provision of this space enlarges the size of the air-conditioning system.

SUMMARY OF THE INVENTION

An object of the present invention is to provide an air passageway opening/closing device able to open/close two air passageways by a small sized, simple mechanism.

Another object of the present invention is to realize an air passageway opening/closing device able to simultaneously open two air passageways with a small sized, simple mechanism by positioning a door opening at the center portions of two adjacent air passageways.

To attain the above object, according to a first aspect of the present invention, there is provided an air passageway opening/closing device provided with two adjacent air passageways (11, 12) and a door means (30) moving in a direction of arrangement of the two air passageways (11, 12) for opening/closing the two air passageways (11, 12), wherein the door means (30) is constructed by a plurality of sheet members (31 to 34) superposed in a direction of flow of air in the two air passageways (11, 12); the plurality of sheet members (31 to 34) have openings (31a to 34a) for being aligned with at least one of the two air passageways (11, 12) to open at least one of the two air passageways (11, 12) and passageway blocking parts (31b to 34c) located on two sides of the direction of door movement of the openings (31a to 34a); outside dimensions in the direction of door movement of the plurality of sheet members (31 to 34) and the lengths in the direction of door movement of the openings (31a to 34a) differ from each other by predetermined amounts; as soon as an adjacent smaller sheet member among the plurality of sheet members (31 to 34) has moved in the direction of door movement by a predetermined amount, the smaller sheet member and an adjacent larger sheet member start to move together; and opening ranges of the two air passageways (11, 12) are determined by only a position of movement of the opening (31a) of the smallest sheet member (31), and blocking ranges of the two air passageways (11, 12) are determined by superposing the passageway blocking parts (31b to 34c) of the plurality of sheet members (31 to 34) in a stepwise offset state.

Figure 6:
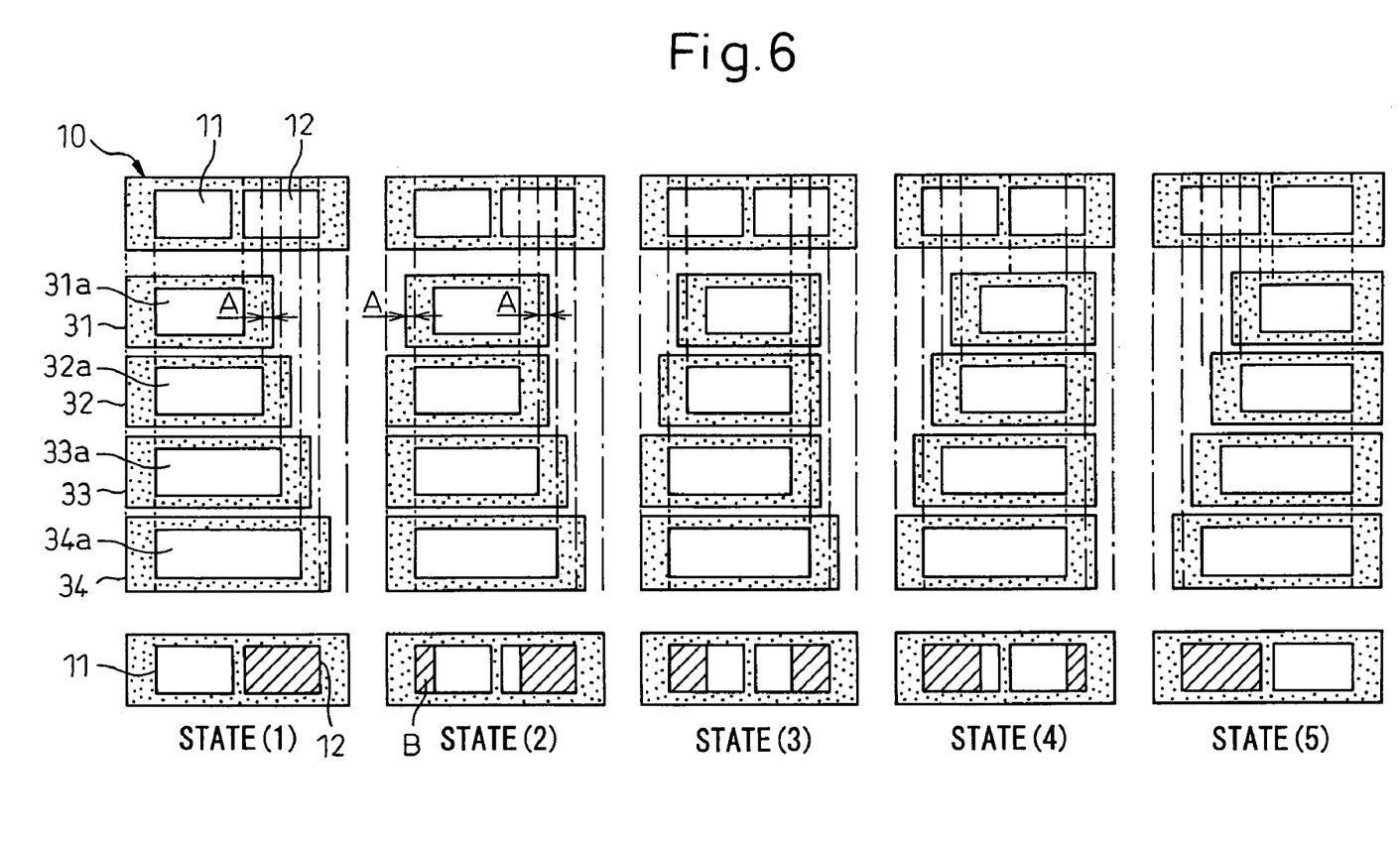
FIG. 6 is an explanatory view of an operation pattern of the multilayer sliding door according to the first embodiment.

Due to this, as illustrated in FIG. 6 explained later, the function of fully opening the two air passageways (11, 12) can be secured by the opening (31a) of the smallest sheet member (31), while the function of fully closing the two air passageways (11, 12) can be secured by the superposition of the passageway blocking parts (31b to 34c) of the plurality of sheet members (31 to 34) in the stepwise offset state (refer to (a) of FIG. 1).

Accordingly, the lengths X of the passageway blocking parts (31b to 34c) of the plurality of sheet members (31 to 34) can be set to lengths much smaller when compared with the opening length (L0) of the two air passageways (11, 12) in the direction of door movement B. Due to this, the overall size of the air passageway opening/closing device can be effectively made smaller.

In addition, according to the present invention, the openings (31a to 34a) are located at the center portion in the direction of door movement B of the plurality of sheet members (31 to 34), the passageway blocking parts (31b to 34c) are located at the two sides of these openings (31a to 34a) of the direction of door movement B, and the opening regions of the two air passageways (11, 12) are determined by the position of movement of the opening (31a) of the smallest sheet member (31), therefore the flow of air toward the two air passageways (11, 12) reliably passes through the opening (31a) of the smallest sheet member (31).

For this reason, in states simultaneously opening the two air passageways (11, 12) such as the states (2) to (4) of FIG. 6, the center portions of the two passageways (11, 12) can be opened by the opening (31a).

Due to this, even when sending mixed air of cool air and warm air into the two air passageways (11, 12), both of the cool air and warm air can be sent into the passageways (11, 12) through the opening (31a) located at the center portions of the passageways (11, 12).

Accordingly, since the cool air and the warm air flow close to each other in the opening (31a), the phenomenon of separation of the cool air and warm air does not occur, and the control of the temperature of the air flowing in the two passageways (11, 12) becomes easy.

According to a second aspect of the present invention, there is provided an air passageway opening/closing device provided with two adjacent air passageways (11, 12) and a door means (30) moving in a direction of arrangement of the two air passageways (11, 12) for opening/closing the two air passageways (11, 12), wherein the door means (30) is constructed by a plurality of sheet members (31 to 34) superposed in a direction of flow of air in the two air passageways (11,12); the plurality of sheet members (31 to 34) have openings (31a to 34a) for being aligned with at least one of the two air passageways (11, 12) to open at least one of the two air passageways (11, 12) and passageway blocking parts (31b to 34c) located on two sides of the direction of door movement of the openings (31a to 34a); outside dimensions in the direction of door movement of the plurality of sheet members (31 to 34) and the lengths in the direction of door movement of the openings (31a to 34a) differ from each other by predetermined amounts; the magnitude of the predetermined amount is set so that when a passageway blocking part on one end of an adjacent smaller sheet member among the plurality of sheet members (31 to 34) blocks a predetermined region of one end of the opening of a larger sheet member, the front end on the other end of the smaller sheet member is located at substantially the same position of the front end on the other end side of the larger sheet member; and as soon as the front ends on the other ends of the adjacent two sheet members have become substantially the same in position, the adjacent two sheet members start to move together.

The second aspect of the present invention defines specifically how to set the difference in the outside dimensions of a plurality of sheet members (31 to 34) in the direction of door movement and the difference of lengths of the openings (31a to 34a) in the direction of door movement.

By defining the difference in outside dimensions of the sheet members and the difference of lengths of the openings in the direction of door movement as in the second aspect of the present invention, in the same way as in the first aspect, the opening ranges of two air passageways (11, 12) can be determined by the position of movement of the opening (31a) of the smallest sheet member (31), while by superposing the passageway blocking parts (31b to 34c) of a plurality of sheet members (31 to 34) in a stepwise offset state, the blocking ranges of the two air passageways (11, 12) can be determined. Accordingly, in the second aspect of the present invention as well, actions and effects the same as those in the first aspect can be exhibited.

In a third aspect of the present invention, there is provided the first and second aspects of the present invention wherein a drive force in the direction of door movement is applied to only the smallest sheet member (31) among the plurality of sheet members (31 to 34).

In a fourth aspect of the present invention, there is provided the third aspect of the present invention wherein when a smaller sheet member moves in the direction of door movement by a predetermined amount, a linkage means (31d to 33e) for moving the smaller sheet member and a larger sheet member together is provided in the smaller sheet member.

Due to this, the linkage means (31d to 33e) integral with the smaller sheet member enables reliable linked operation of the smaller sheet member and the larger sheet member.

In a fifth aspect of the present invention, there is provided the fourth aspect of the present invention, wherein the linkage means is comprised of projections (31d to 33e) projecting from the two front and rear ends of the opening in the direction of door movement of the opening of the smaller sheet member to the inside of the opening of the larger sheet member.

Due to this, the abutment (catching) action of the projections (31d to 33e) formed integrally with the sheet members and the end faces of the openings enables linked operation of the smaller sheet member and the larger sheet member and enables the linkage means to be simply constructed.

In a sixth aspect of the present invention, there is provided the third aspect of the present invention, wherein the plurality of sheet members (31 to 34) are successively superposed from the smallest member to the largest member from an upstream side toward a downstream side of the flow of air.

Due to this, the air pressure of the air flow can be utilized to bring the superimposed portions of the passageway blocking parts of a plurality of sheet members into close contact. That is, the self-sealing action utilizing the air pressure enables the sealing property of the air passageway opening/closing door means to be improved by a simple construction.

In a seventh aspect of the present invention, there is provided the sixth aspect of the present invention, wherein three or more of the plurality of sheet members (31 to 34) are successively superposed from a smaller to a larger member for reducing the size.

In an eighth aspect of the present invention, there is provided the sixth aspect of the present invention, wherein provision is made of a housing (10) forming the two air passageways (11, 12), a largest sheet member (34) among the plurality of sheet members (31 to 34) contacts a sealing surface (10a) at which upstream ends of the two air passageways (11, 12) open in the housing (10), and the sealing surface (10a) is formed to an arc shape projecting outward toward the downstream side of the air flow.

Due to this, the passageway blocking parts (34b, 34c) located at the two sides of the direction of door movement of the largest sheet member (34) located on the downstream most side can be more reliably brought into tight contact with the wall of the arc shaped sealing surface (10a) by the air pressure, and the sealing property can be further improved.

In a ninth aspect of the present invention, there is provided the sixth aspect of the present invention, wherein provision is made of a driven gear (43) formed so as to extend in the direction of door movement at a circumferential edge of the opening (31a) of the smallest sheet member (31) and a drive shaft (41) having a drive gear (42) meshed with the driven gear (43), and a driving force in the direction of door movement is applied to the smallest sheet member (31) by the rotation of the drive shaft (41).

Due to this, the smallest sheet member (31) can be located on the upstream most side of the air flow and arranged away from the door sealing surface, therefore the drive mechanism including the driven gear (43), the drive gear (42), the drive shaft (41), etc. can be easily arranged without interference with the sealing surface (10a).

In a 10th aspect of the present invention, there is provided the eighth aspect of the present invention, wherein provision is made of a driven gear (43) formed so as to extend in the direction of door movement at a circumferential edge of the opening (31a) of the smallest sheet member (31) and a drive shaft (41) having a drive gear (42) meshed with the driven gear (43), a driving force in the direction of door movement is applied to the smallest sheet member (31) by the rotation of the drive shaft (41), the sheet members (32 to 34) other than the smallest sheet member (31) among the plurality of sheet members (31 to 34) are previously shaped to arc shapes having larger radii of curvature than the arc shaped sealing surface (10a) or flat shapes, and the other sheet members (32 to 34) are elastically deformed by a pressing force from the drive shaft (41) side and are pushed against the arc-shaped sealing surface (10a).

According to this, the effect of improving the sealing property can be exhibited. Namely, the arc shaped or flat shaped sheet members (32 to 34) are elastically deformed against the arc-shaped sealing surface (10a) of the housing and are pushed against the arc-shaped sealing surface (10a) by the pressing force from the drive shaft (41) side utilizing the difference of the radius of curvature, therefore the sealing property can be improved by the combination of the self-sealing action utilizing the air pressure and the tight contact action by the pressing force from the drive shaft (41) side.

Further, according to the 10th aspect of the present invention, even when the sheet members (31 to 34) do not receive any air pressure, a sealing property can be exhibited by the pressing force from the drive shaft (41) side.

Further, by an elastic counter force (refer to the arrow Fc of FIG. 4) accompanying elastic deformation of the arc shaped or flat shaped sheet members (32 to 34), it becomes possible to also reduce the backlash of the meshed portion of the driven gear (43) and the drive gear (42).

In an 11th aspect of the present invention, there is provided the third aspect of the present invention, wherein provision is made of a first housing (10) forming the two air passageways (11, 12), a second housing (20) facing the first housing (10), and a drive mechanism (40) applying a driving force in the direction of door movement to the smallest sheet member (31), the plurality of sheet members (31 to 34) and the drive mechanism (40) are sandwiched inside the first housing (10) and the second housing (20), and the plurality of sheet members (31 to 34), the drive mechanism (40), and the first and second housings (10, 20) are combined as a single assembly.

According to this, since the plurality of sheet members (31 to 34) and the drive mechanism (40) are sandwiched inside the first and second housings (10, 20) and combined as a single assembly, the entire air passageway opening/closing device can be handled as a single assembly. Accordingly, the air passageway opening/closing device can be easily assembled into the air flow passageways of an air-conditioning system etc.

In a 12th aspect of the present invention, there is provided the third aspect of the present invention, wherein two adjacent sheet members are shaped by materials different from each other. In this case, occurrence of abnormal sound due to a stick-slip phenomenon can be suppressed.

According to a 13th aspect of the present invention, there is provided an automotive air-conditioning system provided with an air passageway opening/closing device as set forth in the third aspect of the present invention, wherein the two air passageways (11, 12) are connected to air vent passageways (59, 60) for venting air into different portions in a cabin, and the air flows of the two air vent passageways (59, 60) are switched by the air passageway opening/closing device.

Due to this, the actions and effects according to the present invention can be exhibited in a vent mode switching device of an automotive air-conditioning system.

According to a 14th aspect of the present invention, there is provided an automotive air-conditioning system provided with an air passageway opening/closing device as set forth in the third aspect of the present invention, wherein provision is made of a heating use heat exchanger (54) for heating air flowing toward the interior of a cabin, a warm air passageway (56) through which warm air passed through the heating use heat exchanger (54) flows, and a cool air passageway (55) through which cool air flows bypassing the heating use heat exchanger (54), one of the two air passageways (11, 12) is connected to the warm air passageway (56), the other of the two air passageways (11, 12) is connected to the cool air passageway (55), and the opening degree of the warm air passageway (56) and the opening degree of the cool air passageway (55) are adjusted by the air passageway opening/closing device.

Due to this, the actions and effects according to the present invention can be exhibited in an air mix door mechanism for adjusting the opening degree of the warm air passageway (56) and the opening degree of the cool air passageway (55) of the automotive air-conditioning system.

Note that the notations in parentheses after the above-described means indicate correspondence with specific means disclosed in the embodiments mentioned later.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1:
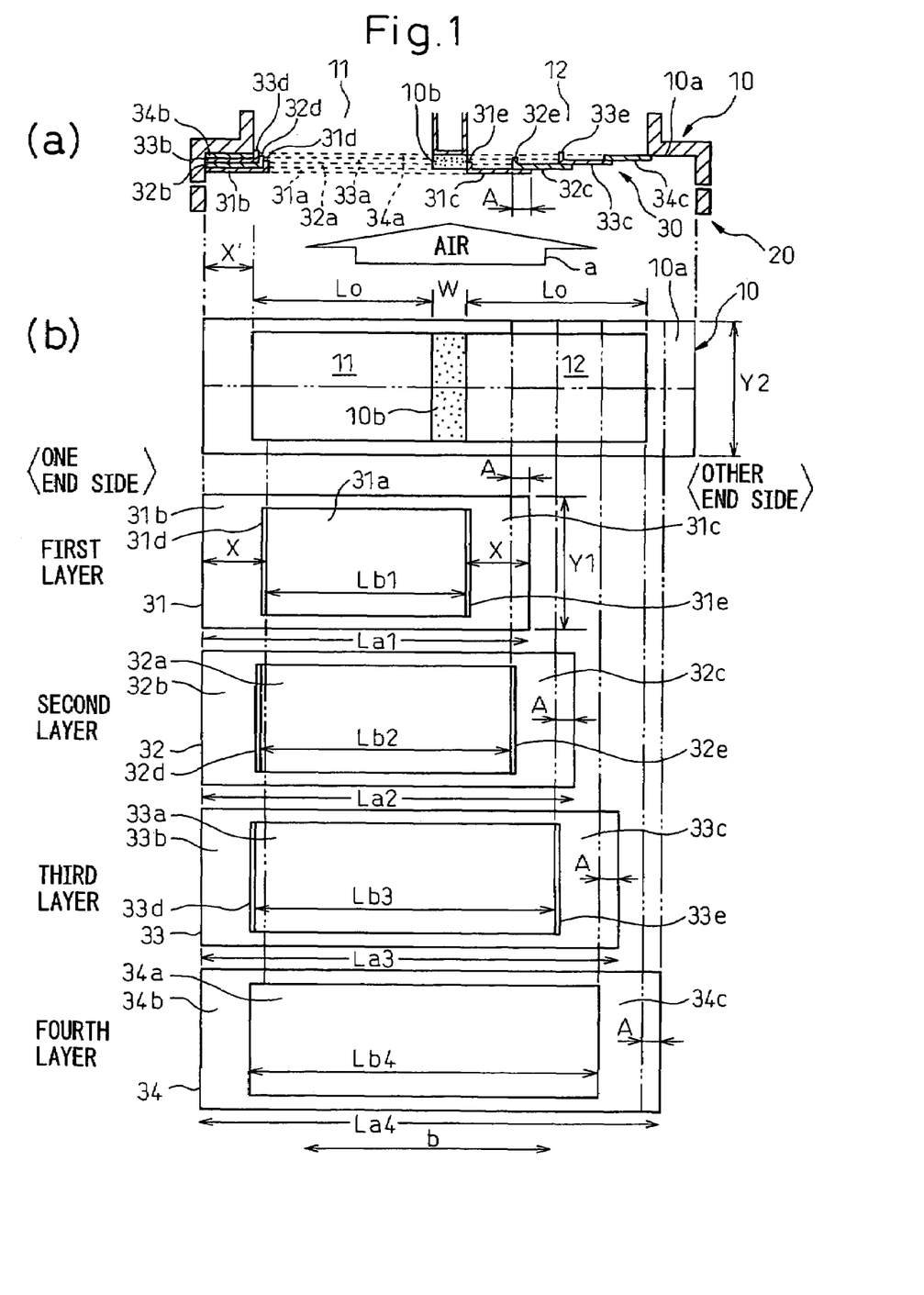
FIG. 1 gives a schematic cross-sectional view (a) of the basic structure of an air passageway opening/closing device using a multilayer sliding door according to a first embodiment of the present invention and a plan developed diagram thereof (b)
Figure 2:
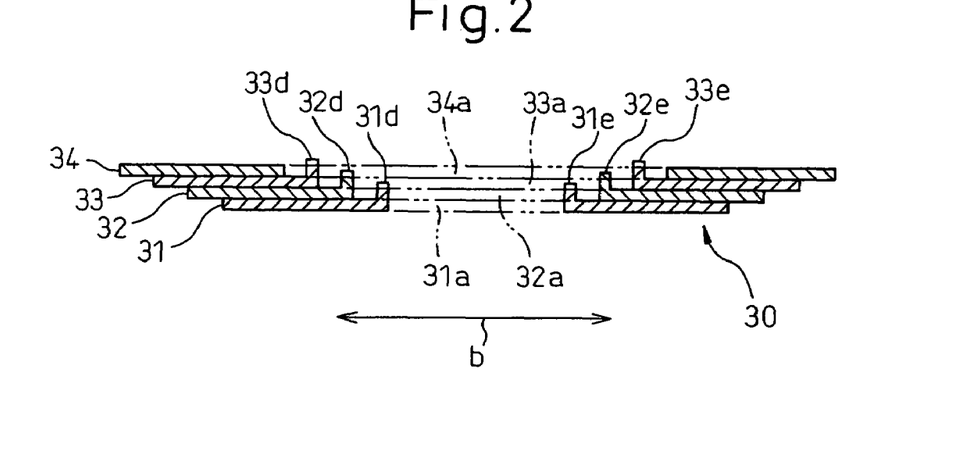
FIG. 2 is a cross-sectional view exemplifying a linkage means of the multilayer sliding door according to the first embodiment of the present invention.
Figure 3:
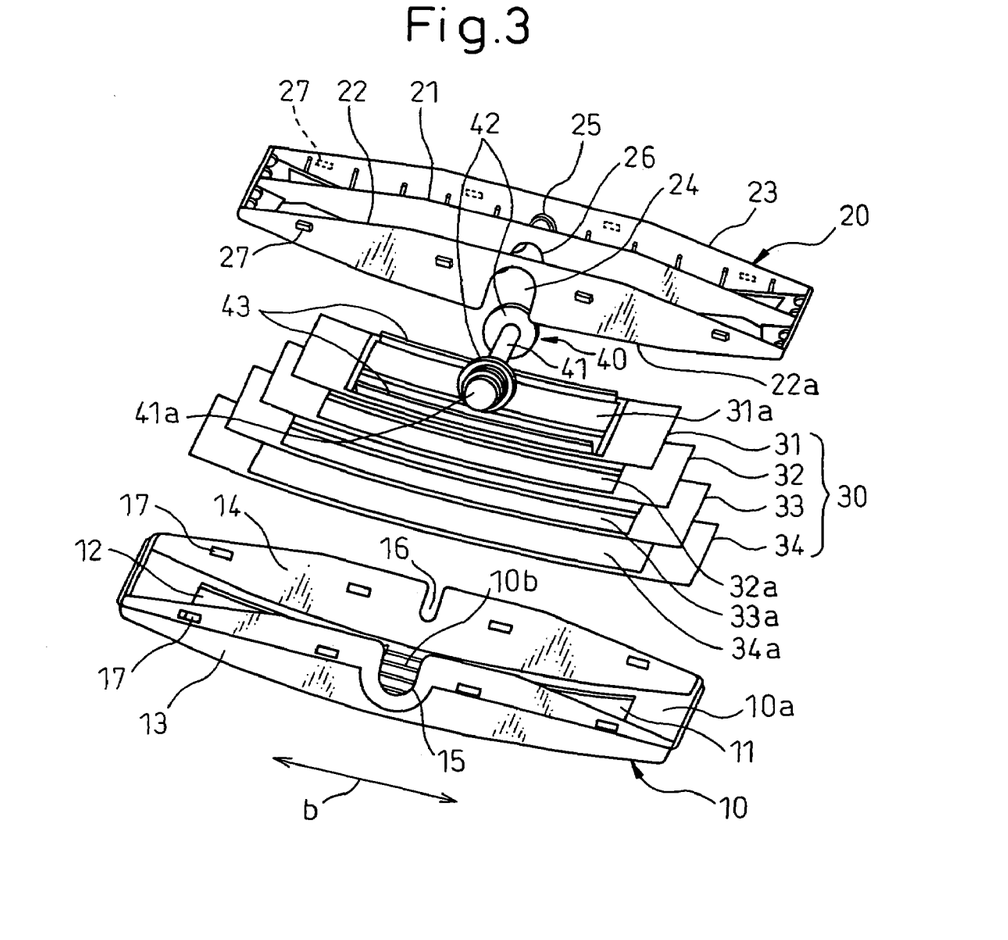
FIG. 3 is a schematic disassembled view of the air passageway opening/closing device according to the first embodiment.
Figure 4:
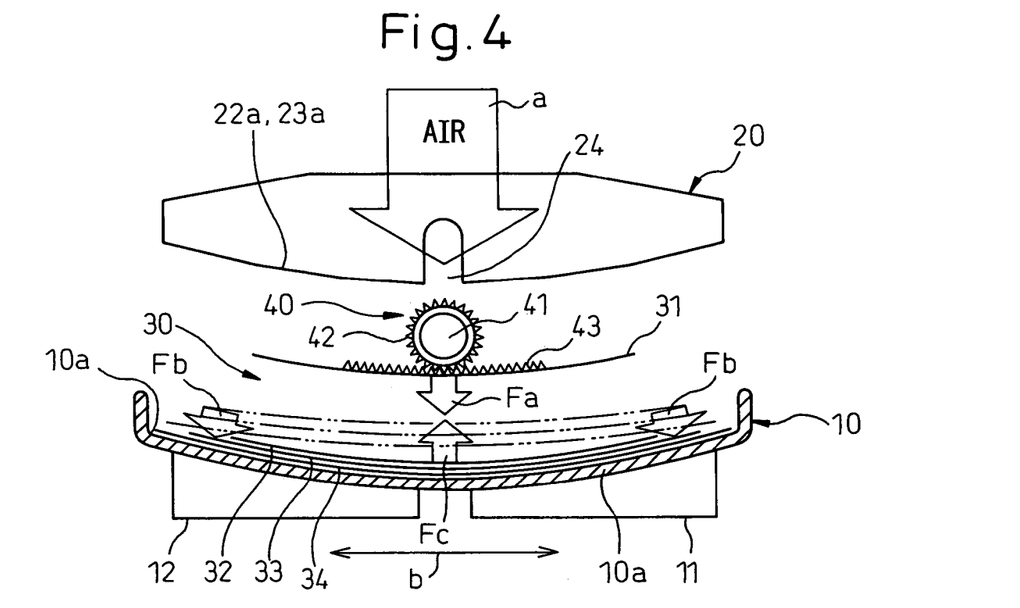
FIG. 4 is a schematic disassembled cross-sectional view explaining a sealing action of the multilayer sliding door according to the first embodiment.
Figure 5:
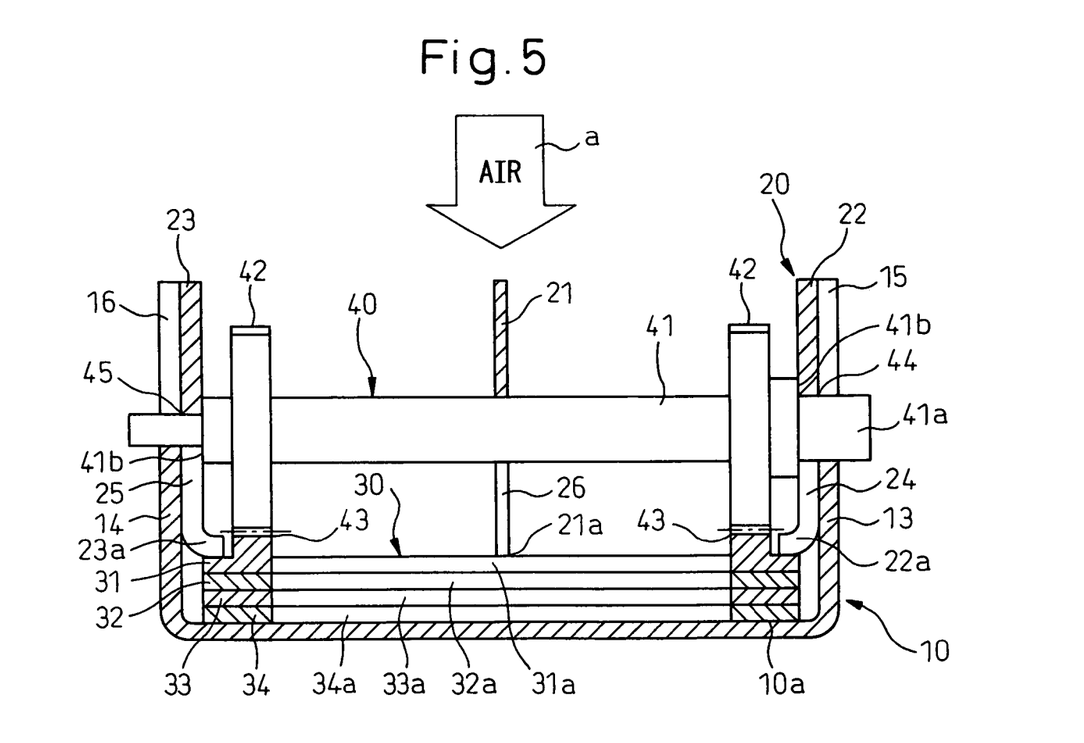
FIG. 5 is a cross-sectional view in an axial direction of a drive mechanism of the multilayer sliding door according to the first embodiment.
Figure 7:
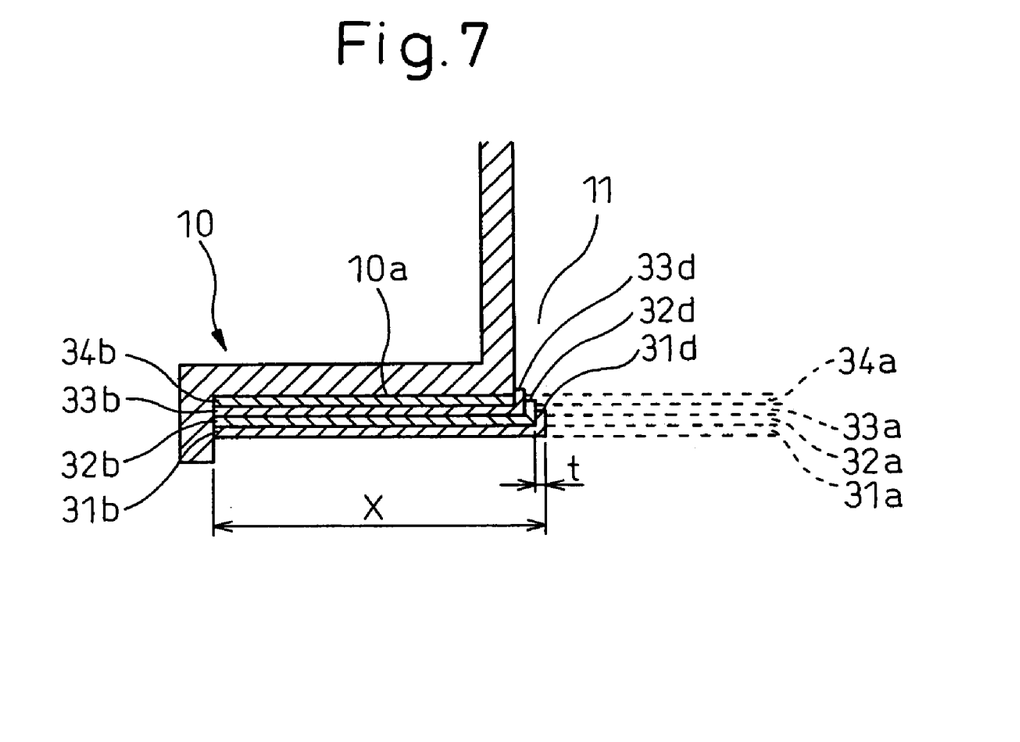
FIG. 7 is an enlarged cross-sectional view of a left side passageway blocking part of (a) of FIG. 1.

FIG. 1 to FIG. 7 show a first embodiment of the present invention, in which (a) of FIG. 1 is a schematic cross-sectional view of the basic structure of an air passageway opening/closing device using a multilayer sliding door according to a first embodiment of the present invention; and (b) of FIG. 1 is a plan developed view thereof. FIG. 2 is a cross-sectional view exemplifying a linkage means of the multilayer sliding door according to the first embodiment of the present invention. FIG. 3 is a schematic disassembled view of the air passageway opening/closing device according to the first embodiment. FIG. 4 is a schematic disassembled cross-sectional view explaining a sealing function of the multilayer sliding door according to the first embodiment. FIG. 5 is a cross-sectional view in an axial direction of a drive mechanism of the multilayer sliding door according to the first embodiment. FIG. 6 is an explanatory view of an operation pattern of the multilayer sliding door according to the first embodiment; and FIG. 7 is an enlarged cross-sectional view of a left side passageway blocking part of (a) of FIG. 1.

The air passageway opening/closing device according to the present embodiment is roughly comprised of, as shown in FIG. 3 and FIG. 4, a first housing 10 made of a plastic located on a downstream side of an air flow, a second housing 20 made of a plastic located on an upstream side of the air flow, a multilayer sliding door 30 accommodated in these first and second housings 10 and 20, and a drive mechanism 40 for imparting to the multilayer sliding door 30 a driving force for moving the multilayer sliding door 30.

In the first housing 10 on the downstream side of the air flow, two, a first and second, air passageways 11 and 12 are formed adjacently. In this example, the first and second air passageways 11 and 12 are formed as rectangular shapes having the same opening areas.

The multilayer sliding door 30 moves in a direction of arrangement b of these two air passageways 11 and 12, in other words, the direction b intersecting the air flow direction a, to open/close the air passageways 11 and 12. Below, a detailed description will be given of the specific construction of the multilayer sliding door 30.

The multilayer sliding door 30 is constructed by superposing a plurality of sheet members 31 to 34 in the air flow direction a as shown in (a) of FIG. 1. In the present example, a four-layer structure comprised of four sheet members 31 to 34 superposed on each other is formed. Also, in the present example, the sheet members 31 to 34 are formed in sheet shapes having a thickness of about 0.8 mm by a plastic material having a certain degree of elasticity.

Note that, as a specific material of the sheet members 31 to 34, for example, an ABS resin, a PET resin (polyethylene terephthalate), polypropylene, etc. are preferred.

The basic shapes of the sheet members 31 to 34 are the same. Namely, the sheet members 31 to 34 exhibit rectangular states having rectangular openings 31a, 32a, 33a, and 34a and passageway blocking parts 31b, 31c, 32b, 32c, 33b, 33c, 34b, and 34c located on the two sides of the direction of door movement b of the openings 31a to 34a. Note that the illustrated example shows rectangles wherein the outside dimensions La1 to La4 in the direction of door movement b of the sheet members 31 to 34 are larger than the width dimension Y1, but they may also be rectangles wherein the width dimension Y1 is larger than the outside dimensions La1 to La4 in the direction of door movement b of the sheet members 31 to 34.

However, the sizes of the sheet members 31 to 34 are different. Namely, the sizes of the sheet members 31 to 34 successively become larger from the upstream side toward the downstream side of the air flow. That is, the plurality of (four) sheet members 31 to 34 are successively superposed from the smallest member to the largest member from the upstream side toward the downstream side of the air flow.

Explaining the sizes of the sheet members 31 to 34 more specifically, the lengths Lb1 to Lb4 in the direction of door movement b of the openings 31a to 34a successively become larger by predetermined amounts in sequence from the upstream sheet member 31 toward the downstream sheet members 32, 33, and 34 in the air flow. On the other hand, the lengths X in the direction of door movement b of the passageway blocking parts 31b, 31c, 32b, 32c, 33b, 33c, 34b, and 34c are basically set to the same dimension. Note that, in the present example, for the reasons mentioned later, the passageway blocking part lengths X are made different by fine amounts corresponding to the thicknesses of the projections 31d to 33e forming the linkage means.

Since the dimensional relationship is set as explained above, the outside dimensions La1 to La4 in the direction of door movement b of the sheet members 31 to 34 successively become larger by predetermined amounts from the upstream sheet member 31 of the air flow to the downstream sheet members 32, 33, and 34.

The width dimension Y1 of the sheet members 31 to 34 (dimension in a direction perpendicular to the direction of door movement b) is the same. This sheet member width dimension Y1 is substantially the same as the width dimension Y2 of the sealing surface 10a of the first housing 10. Accordingly, the width dimensions of the openings 31a to 34a are also the same.

Here, the sealing surface 10a is the wall formed at the circumferential edges of the upstream openings of the first and second air passageways 11 and 12 in the first housing 10. This sealing surface 10a is formed in an arc shape projecting out toward the downstream side of the air flow as shown in FIG. 3 and FIG. 4 explained later.

Note that, in the following explanation, to differentiate the sheet members 31 to 34, the members are called the "first layer" to the "fourth layer" from the upstream side toward the downstream side of the air flow. Accordingly, the first layer sheet member 31 is the smallest sheet member located at the upstream most part, while the fourth layer sheet member 34 is the largest sheet member located at the downstream most part.

The opening area of the opening 31a of the first layer sheet member 31, that is, the smallest opening 31a, is set to a size able to fully open the first air passageway 11 or the second air passageway 12. For this reason, the length Lb1 in the direction of door movement b of the opening 31a of the first layer sheet member 31 becomes a size obtained by adding an interval W between the passageways 11 and 12 to the length L0 in the direction of door movement b of the first air passageway 11 or the second air passageway 12 (Lb1=L0+W).

A driving force is applied to the first layer sheet member 31 from the drive mechanism 40 to make the first layer sheet member 31 move in the direction of door movement b. Linked with the movement of this first layer sheet member 31, the second layer to fourth layer sheet members 32, 33, and 34 are successively moved.

Explaining the linkage means for linking these first layer to the fourth layer sheet members 31 to 34 by FIG. 2, this linkage means is constructed by projections 31d, 31e, 32d, 32e, 33d, and 33e provided at the sides of the openings 31a to 33a of the first layer to third layer sheet members 31 to 33 in the front and rear direction of door movement b. These projections 31d to 33e can be shaped integrally with the first layer to third layer sheet members 31 to 33 by injection molding.

These projections 31d to 33e are projected to the insides of the openings 32a to 34a of the downstream sheet members 32 to 34 by bending the surfaces of the first layer to third layer sheet members 31 to 33 to L-shapes.

Due to this, when the first layer sheet member 31 moves to the right side or left side of the direction of door movement b from the state of FIG. 2, and the projection 31d or 31e of the first layer sheet member 31 contacts-the end face in the direction of door movement b of the opening 32a of the second sheet member 32, the first layer sheet member 31 and the second layer sheet member 32 can move to the right side or left side of the direction of door movement b together.

In the same way, when the projection 32d or 32e of the second layer sheet member 32 contacts the end face in the direction of door movement b of the opening 33a of the third layer sheet member 33, the first to third layer sheet members 31, 32, and 33 can move in the direction of door movement b together.

Then, when the projection 33d or 33e of the third layer sheet member 33 contacts the end face in the direction of door movement b of the opening 34a of the, fourth layer sheet member 34, the first to fourth layer sheet members 31, 32, and 33, and 34 can move in the direction of door movement b together.

The state (2) of FIG. 6 is a state where the right side projection 31e of the first layer sheet member 31 contacts the right side end face in the direction of door movement b of the opening 32a of the second layer sheet member 32 and where the first layer and second layer sheet members 31 and 32 start movement together to the right side of the direction of door movement b.

In the state (2) of FIG. 6, the passageway blocking part 31b on one end (left side in illustration) of the first layer sheet member 31 secures a predetermined overlay dimension A with the passageway blocking part 32b at one side (left side in illustration) of the second layer sheet member 32. When a predetermined region (hatched portion B) at one end (left side in illustration) of the opening 32a of the second layer sheet member 32 is blocked by the passageway blocking part 31b on one end (left side in illustration) of the first layer sheet member 31, the front end of the other end (right side in illustration) of the first layer sheet member 31 becomes the same position as the front end on the other end (right side in illustration) of the second layer sheet member 32.

The dimensional difference of the outside dimensions La1 and La2 in the direction of door movement b of the first layer sheet member 31 and the second layer sheet member 32 and the dimensional difference of the lengths Lb1 and Lb2 of the openings 31a and 32a are set so as to satisfy such position relationships.

A state (3) of FIG. 6 is a state where the first layer to third layer sheet members 31 to 33 start movement together to the right side of the direction of door movement b. In this state, the outside dimensions of the first layer to third layer sheet members 31 to 33 and the dimensional difference of the openings are set so that the right side ends (the other ends of FIG. 1) of the first layer to third layer sheet members 31 to 33 become the same position.

A state (4) of FIG. 6 is a state where the first layer to fourth layer sheet members 31 to 34 start movement together to the right side of the direction of door movement b. In this state, the outside dimensions of the first layer to fourth layer sheet members 31 to 34 and the dimensional difference of the opening lengths are set so that the right side ends (the other ends in FIG. 1) of the first layer to fourth layer sheet members 31 to 34 become the same position.

Note that, in FIG. 6, the passageway blocking parts on the casing 10 side and the sheet member 31 to 34 side are shaded to facilitate understanding.

The states (1) of FIG. 1 and FIG. 6 show the state where the first air passageway 11 is fully opened and where the second air passageway 12 is fully closed by the sheet members 31 to 34. In this state, the second air passageway 12 is fully closed by superposing the right side passageway blocking parts 31c, 32c 33c, and 34c of the sheet members 31 to 34 in the stepwise offset state as shown in (a) of FIG. 1.

Here, a predetermined overlay dimension A is set among the passageway blocking parts 31c, 32c, 33c, and 34c and between the downstream most passageway blocking part 34c and the housing side casing surface 10a so as to guarantee the fully closed state of the second air passageway 12. This overlay dimension A is for example about 5 mm.

The dimensional difference of the outside dimensions La1 to La4 of the first layer to fourth layer sheet members 31 to 34 and the dimensional difference of the lengths Lb1 to Lb4 of the openings 31a to 34a described above are basically the differences between the lengths X of the passageway blocking parts 31b, 31c to 34b, and 34c and the overlay dimensions A (X-A).

Note that, in the present example, in the fully opened state of the first air passageway 11 shown in FIG. 1 and FIG. 6(1), in order to make the front end positions at ends (left sides) of the first layer to fourth layer sheet members 31 to 34 uniform, the lengths X of the passageway blocking parts 31b, 32b, 33b, and 34b at ends (left side) of the first layer to fourth layer sheet members 31 to 34 are successively made smaller by fine amounts corresponding to the sheet thickness t of the projections 31d, 32d, and 33d from the first layer passageway blocking part 31b to the fourth layer passageway blocking part 34b as shown in the cross-sectional shaped part of FIG. 7.

In the same way, in the fully opened state of the second air passageway 12 shown in FIG. 6(5), in order to make the front end positions of the other ends (right side) of the first layer to fourth layer sheet members 31 to 34 uniform, the lengths X of the passageway blocking parts 31c, 32c, 33c, and 34c on the other ends (right side) of the first layer to fourth layer sheet members 31 to 34 are successively made smaller by fine amounts corresponding to the sheet thickness t of the projections 31e, 32e, and 33e from the first layer passageway blocking part 31c to the fourth layer passageway blocking part 34c. The sheet thicknesses t of the projections 31d to 33e are set to dimensions larger than the sheet thicknesses of the sheet members 31 to 34, for example about 1.5 mm in the present example, in order to reliably transmit the driving force.

In this way, the passageway blocking part lengths X of the first layer to fourth layer sheet members 31 to 34 differ by fine amount, therefore the dimensional difference (X–A) described above differs by fine amounts for the sheet members 31 to 34.

In the sealing surface 10a of the first housing 10, in the intermediate portion (portion of the width W) of the first and second air passageways 11 and 12, a projection sealing surface 10b (refer to FIG. 1) projecting in the inward direction of the openings 31a to 34a of the first to fourth layer sheet members 31 to 34 is formed. This projection sealing surface 10b projects out up to the position the projections 31d and 31e of the first layer sheet member 31 contact as shown in (a) of FIG. 1.

In the example of (a) of FIG. 1, the height of the projection sealing surface 10b is set so that the front end of the projection sealing surface 10b reaches the bases of the projections 31d and 31e of the first layer sheet member 31.

Next, a specific explanation will be given of the drive mechanism 40 of the multilayer sliding door 30, the assembly structure, the sealing structure, etc. by FIG. 3 to FIG. 5. Note that FIG. 3 to FIG. 5 illustrate the arrangement of the first and second housings 10 and 20 in a state where they are vertically reversed from FIG. 1, therefore the air flow direction a becomes a direction upward to downward.

The drive mechanism 40 is constructed by a drive shaft 41, two drive gears 42 provided integrally separated by a predetermined interval corresponding to the width dimension of the first layer opening 31a in the axial direction of the drive shaft 41, and a driven gear 43 provided in the first layer sheet member 31 in the present example.

The driven gear 43 is a linear gear (rack) formed at the circumferential edges at the two sides of the width direction of the opening 31a in the first layer sheet member 31 so as to extend along the direction of door movement b. The driven gear 43 is shaped integrally with the first layer sheet member 31 by a plastic. The drive gear 42 is a circular gear (pinion) meshed with this linear driven gear 43. The drive shaft 41 is made of a plastic, therefore the drive gear 42 is shaped integrally with the drive shaft 41 by a plastic.

In the second housing 20 on the upstream side of the air flow, an intermediate wall 21 extending along the direction of door movement b is integrally formed at the intermediate position in the axial direction of the drive shaft 41 (direction perpendicular to the direction of door movement b). This intermediate wall 21 presses against the passageway blocking parts 31b and 31c of the first layer sheet member 31 to the sealing surface 10a side of the first housing 10.

Due to this, flapping of the passageway blocking parts 31b, 31c to 34b, and 34c of the first layer to fourth layer sheet members 31 to 34 is prevented, the sealing property among the passageway blocking parts 31b, 31c to 34b, and 34c is improved, and the sealing property of the multilayer sliding door 30 is raised.

As shown in FIG. 3, U-shaped grooves 15, 16, 24, and 25 are formed in the walls 13, 14, 22, and 23 extending along the direction of door movement b of the first and second housings 10 and 20. As shown in FIG. 5, the walls 22 and 23 of the second housing 20 are fit inside the walls 13 and 14 of the first housing 10.

Due to this, by combining the U-shaped grooves 15 and 16 of the first housing 10 and the U-shaped grooves 24 and 25 of the second housing 20, bearings 44 and 45 (FIG. 5) for rotatably supporting the two ends of the drive shaft 41 in the axial direction are constructed. In the intermediate wall 21 of the second housing 20, a U-shaped groove 26 for avoiding the influence with the drive shaft 41 is formed.

Note that, in the present example, a plurality of outwardly projecting mounting tabs 27 are integrally formed with the outside surfaces of the walls 22 and 23 of the second housing 20. A plurality of mounting holes 17 able to engage with these mounting tabs 27 are formed in the walls 13 and 14 of the first housing 10.

For this reason, by fitting the walls 22 and 23 of the second housing 20 inside the walls 13 and 14 of the first housing 10 and engaging the plurality of mounting tabs 27 of the walls 22 and 23 of the second housing 20 with the plurality of mounting holes 17 of the walls 13 and 14 of the first housing 10, the first housing 10 and the second housing 20 can be assembled together.

By the assembly of these housings 10 and 20, the multilayer sliding door 30 (first layer to fourth layer sheet members 31 to 34) is elastically sandwiched and supported between the intermediate wall 21 of the drive gear 42 of the drive shaft 41 and the second housing 20 and the arc-shaped sealing surface 10a of the first housing 10. FIG. 5 shows this holding and supporting structure.

Explaining this holding and supporting structure more specifically, in the first layer sheet member 31, thick parts are formed by the linear driven gear 43 at two sides of the opening 31a, therefore the rigidity of the first layer sheet member 31 becomes higher than the rigidity of the second to fourth layer sheet members 32, 33, and 34.

The assembly position of the drive shaft 41 is set so that a pressing force to the arc-shaped sealing surface 10a side of the first housing 10 is applied to the first layer sheet member 31 after passing the meshed portion of the drive gear 42 and the driven gear 43 from the drive shaft 41 when the drive shaft 41 is sandwiched by the bearings 44 and 45 formed between the two housings 10 and 20.

Due to this, the pressing force can be effectively applied from the high rigidity first layer sheet member 31 to the low rigidity second to fourth layer sheet members 32, 33, and 34. Here, the second to fourth layer sheet members 32, 33, and 34 are previously shaped to the arc shape or flat shape (infinitely large radius of curvature) having a radius of curvature larger than the radius of curvature of the arc-shaped sealing surface 10a of the first housing 10 as illustrated by the two-dot chain line in FIG. 4.

For this reason, the pressing force Fa from the first layer sheet member 31 causes a pressing force Fb to the housing side casing surface 10a to act upon the two ends (passageway blocking parts) of the second to fourth layer sheet members 32, 33, and 34. The second to fourth layer sheet members 32, 33, and 34 are elastically deformed along the arc shape of the housing side casing surface 10a.

At this time, the sheet members are successively made larger from the first layer sheet member 31 to the fourth layer sheet member 34. The largest fourth layer sheet member 34 is arranged on the housing side casing surface 10a. Therefore, the pressing force Fb to the two ends of the sheet member can be applied well to the contact portions of the second to fourth layer sheet members 32, 33, and 34 from the first layer sheet member 31.

The first layer sheet member 31 is a member having a driven gear 43 and having a high rigidity, therefore is previously shaped to an arc shape having a radius of curvature close to the radius of curvature of the arc-shaped sealing surface 10a of the first housing 10. Accordingly, there is the relationship that the radius of curvature of the first layer sheet member 31 is smaller than the radii of curvature of the second to fourth layer sheet members 32, 33, and 34.

Then, along with elastic deformation of the second to fourth layer sheet members 32, 33, and 34, at the center portion of the second to fourth layer sheet members 32, 33, and 34 (positions for forming the openings 32a, 33a, and 34a), an elastic counter force Fc in the inverse direction acts upon the first layer sheet member 31. This elastic counter force Fc enables the backlash of the meshed portion of the gears 42 and 43 to be reduced.

One end 41a of the drive shaft 41 in the axial direction, i.e., in the present example, the right side end 41a of FIG. 5, projects outward from the housings 10 and 20, a drive source (not illustrated) such as a servo motor is connected to this projected end 41a via a connection use gear mechanism or link mechanism, and rotational force of this drive source is transmitted to the drive shaft 41. Note that, in place of a drive-source such as a servo motor, a manually operated mechanism may be provided to rotate the drive shaft 41 by a manual operation force of this manually operated mechanism.

By forming steps 41b (FIG. 5) at the two sides of the drive shaft 41 in the axial direction and making the steps 41b abut against the inside surfaces of the walls 22 and 23 of the second housing 20, the assembly position of the drive shaft 41 in the axial direction is defined.

Next, an explanation will be given of the operation of the present embodiment in the above-described construction. When the drive shaft 41 of the drive mechanism 40 rotates by the rotational force of a not illustrated drive source, the meshing of the drive gear 42 of the drive shaft 41 and the driven gear 43 of the first layer sheet member 31 causes the first layer sheet member 31 to move in the direction of door movement b (the direction in which the first and second air passageways 11 and 12 are arranged).

The state (1) of FIG. 1 and FIG. 6 is the state where all of the first layer to fourth layer sheet members 31 to 34 forming the multilayer sliding door 30 move to one end position (left side position) of the direction of door movement b. In this state (1), as shown in (a) of FIG. 1, by coincidence of end positions (left side positions) of the openings 31a to 34a of the sheet members 31 to 34, the first air passageway 11 is fully opened. On the other hand, on the second air passageway 12 side, the passageway blocking parts 31c, 32c, 33c, and 34c on the other end (right side) of the-sheet members 31 to 34 are arranged offset stepwise from the overlay part having the predetermined dimension A so as to fully close the second air passageway 12.

At this time, the projections 31d, 32d, and 33d at one end of the first to third layer sheet members 31 to 33 are concentrated at one end (left side) of the openings 32a to 34a of the second to fourth layer sheet members 32 to 34 as shown in (a) of FIG. 1. Contrary to this, the projections 31e, 32e, and 33e of the other end (right side) of the first to third layer sheet members 31 to 33 are separated from the other end (right side) of the openings 32a to 34a of the second layer to fourth layer sheet members 32 to 34 by exactly the predetermined amount (X−A).

For this reason, whenever the first layer sheet member 31 moves to the right side in the direction of door movement b by a predetermined amount (X−A), the linkage operation of the projections 31e, 32e, and 33e on the right side occurs, and the number of the sheet members moving to the right side in the direction of door movement b in linkage with the first layer sheet member 31 successively increases.

Due to this, the opening ranges of the first and second air passageways 11 and 12 change from the state (1) of FIG. 6 to the state (2), to the state (3), to the state (4), and to the state (5). In the state (5) of FIG. 6, the first air passageway 11 is fully closed, and the second air passageway 12 is fully opened.

Note that the hatched portions in the opening ranges of the first and second air passageways 11 and 12 in the lowermost stage of FIG. 6 are regions blocked by the passageway blocking parts 31b to 34c of the first layer to fourth layer sheet members 31 to 34, while the blank portions are passageway opening regions determined by the position of movement of the opening 31a of the first layer sheet member 31.

The above explanation was given for the case where the first layer to fourth layer sheet members 31 to 34 move to the right side in the direction of door movement b from the state (1) of FIG. 6 toward the state (5), but when the first layer to fourth layer sheet members 31 to 34 move to the left side in the direction of door movement b from the state (5) of FIG. 6 toward the state (1), the first to fourth layer sheet members 31 to 34 successively move toward the left side in the direction of door movement b in linkage by the projections 31d, 32d, and 33d of one end (left side) of the first to third layer sheet members 31 to 33. By this, the opening ranges of the first and second air passageways 11 and 12 change from the state (5) toward the state (1) in FIG. 6.

According to the multilayer sliding door 30 of the present embodiment, the opening regions of the first and second air passageways 11 and 12 are determined by the position of movement of the opening 31a of the first layer sheet member 31. At the same time, the fully closed states of the first and second air passageways 11 and 12 can be achieved by superposing the passageway blocking parts 31b to 34c of the first layer to fourth layer sheet members 31 to 34 offset stepwise.

Accordingly, the lengths X of the passageway blocking parts 31b to 34c of the first to fourth layer sheet members 31 to 34 can be set to lengths much smaller compared with the opening length L0 in the direction of door movement b of the first and second air passageways 11 and 12.

Incidentally, in U.S. Pat. No. 6,669,549, it is necessary to set the flexible film members arranged at the two front and rear sides of the frame shaped part to sizes that can fully close the opening of the air passageway, therefore the length of the direction of door movement of this flexible film member (length corresponding to the length X described above) must be made larger than the opening length in the direction of door movement of the air passageway.

Accordingly, according to the present embodiment, by the reduction of the passageway blocking part length X in comparison with U.S. Pat. No. 6,669,549, the overall size of the air passageway opening/closing device can be effectively reduced.

Note that, even in the largest fourth layer sheet member 34, the outside dimension La4 thereof can be set within the overall length dimension (L0×2+W+X'×2) in the direction of door movement b of the housing 10. Therefore, even when employing a structure superposing a plurality of sheet members 31 to 34 having different outside dimensions La1 to La4, the reduction of the overall size of the device will not be obstructed.

Further, according to the multilayer sliding door 30 of the present embodiment, the opening regions of the first and second air passageways 11 and 12 are determined by the position of movement of the opening 31a of the first layer sheet member 31. Therefore, the flow of air from the upstream side housing 20 toward the first and second air passageways 11 and 12 of the housing 10 on the downstream side reliably passes through the opening 31a of the first layer sheet member 31.

For this reason, in states simultaneously opening the first and second air passageways 11 and 12 such as the states (2) to (4) of FIG. 6, the center portions of the two passageways 11 and 12 can be opened by the opening 31a.

Incidentally, in the air passageway opening/closing device using a flat sliding door explained in the section on the related art", when simultaneously opening two adjacent air passageways, since the openings of two air passageways are formed separated from each other at the front and rear sides of the direction of movement of the sliding door, the phenomenon of separation of the cool air and warm air occurs and control of the temperature of the air vented from the two air passageways becomes difficult, but in the present embodiment, the cool air and warm air from the upstream side housing 20 pass through the opening 31a located at the center positions of the two passageways 11 and 12, then flow into the two passageways 11 and 12.

Accordingly, the cool air and warm air flow in the opening 31a close to each other, and therefore, the phenomenon of separation of the cool air and warm air does not occur, and the temperature control of the blown air from the first and second air passageways 11 and 12 becomes easy.

Further, in the present embodiment, there is the advantage that the most important function of the air passageway opening/closing door means, that is, the door sealing property, can be secured well with a simple construction.

Namely, the first to fourth layer sheet members 31 to 34 are successively superposed from the smallest member to the largest member from the upstream side toward the downstream side of the direction of air flow a, therefore, as exemplified in the right side portion of (a) of FIG. 1, when blocking the first and second air passageways 11 and 12, the air pressures of the air flows are made to act upon the passageway blocking parts 31b to 34c of the sheet members 31 to 34, and the sheet members 31 to 34 can be deformed in the direction for tight contact of the overlay parts A (on the side for self-sealing in other words).

In addition, when the multilayer sliding door 30 according to the present embodiment employs a holding and supporting structure in addition to this, as shown in FIG. 4, the pressing force Fa from the drive shaft 41 side can press the two ends of the sheet members 31 to 34 (passageway blocking parts 31b to 34c) against the arc-shaped sealing surface 10a of the first housing 10. Therefore, even in a case where the plurality of sheet members 31 to 34 do not receive any air pressure, the sealing property of the multilayer sliding door 30 can be secured.

Note that, in the present embodiment, as shown in FIG. 4 and 5, the downstream side end faces 22a and 23a of the walls 22 and 23 on two sides in the width direction of the second housing 20 press against the sides in the length direction of the plurality of sheet members 31 to 34. At the same time, the downstream side end face 21a of the intermediate wall 21 of the second housing 20 presses against the intermediate portion in the length direction of the plurality of sheet members 31 to 34. Due to this, the sealing property of the multilayer sliding door 30 can be improved.

As described above, even by the simple door construction of only superposing a plurality of sheet members 31 to 34 made of plastic without adding any special sealing material, the sealing property of the multilayer sliding door 30 can be secured well.

Note that when two adjacent sheet members are made of the same plastic material, the two sheet members easily stick together at the time of contact and sliding of the two sheet members. Therefore, after the two sheet members once stick, they generate an abnormal sound when they are separated. Such a phenomenon is generally referred to as the "stick-slip" phenomenon.

Accordingly, preferably the plastic materials of the two adjacent sheet members are changed. For example, the first layer and third layer sheet members 31 and 33 are constructed by an ABS resin, and the second layer and fourth layer sheet members 32 and 34 are constructed by a polypropylene resin. Due to this, the abnormal sound of the stick-slip phenomenon can be suppressed.

Also, even if the same plastic material is used, by forming a surface coating layer, forming fine projections on the surface for dimpling, and performing other surface treatment, the above stick-slip phenomenon may be suppressed.

Second Embodiment

Figure 8:
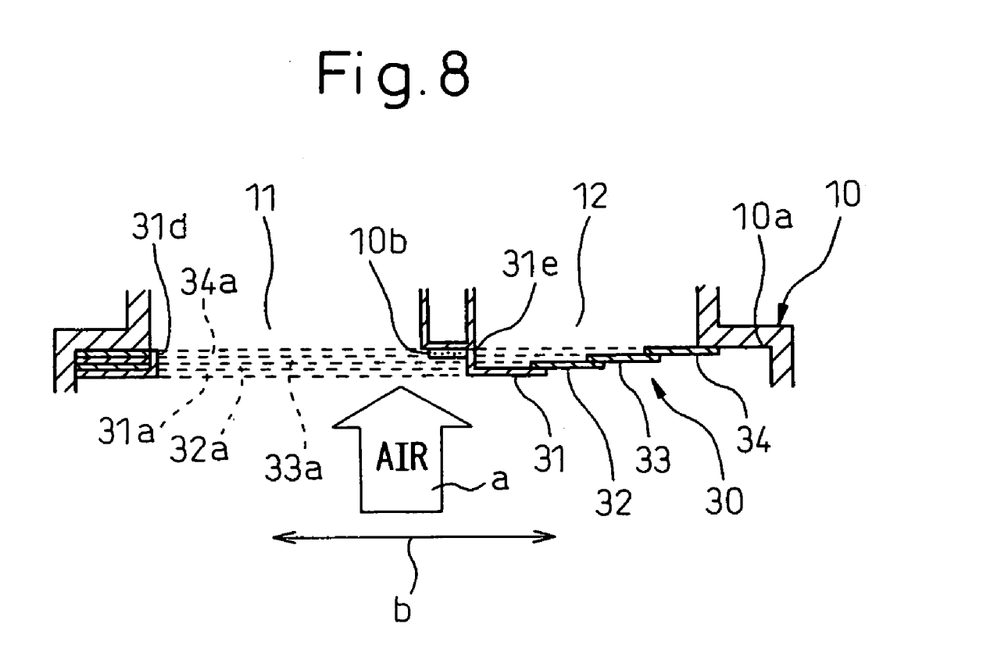
FIG. 8 is a schematic cross-sectional view of a basic structure of an air passageway opening/closing device using the multilayer sliding door according to a second embodiment of the present invention.

In the above first embodiment, the projections 31d to 33e forming the linkage means were formed in the first layer to third layer sheet members 31, 32, and 33, but in the second embodiment, projections 31d and 31e forming the linkage means are provided in only the first layer sheet member 31 as shown in FIG. 8.

For this reason, in the second embodiment, the height of the projections 31d and 31e is made higher so as to be able to contact the end face of the opening 34a of the fourth sheet member 34. Along with this, the height of the projecting sealing surface 10b of the first housing 10 may be kept low.

According to the second embodiment, the linkage use projections 31d and 31e comprised of the sheet bent to L-shapes are provided at only the first layer sheet member 31. No linkage use projections are provided in the second and third sheet members 32 and 33. Therefore, the production costs of the multilayer sliding door 30 can be reduced from those of the first embodiment.

Note that in the second embodiment as well, the function of fully closing and the function of fully opening the first and second air passageways 11 and 12 can be exhibited in the same way as the first embodiment, but when employing a structure providing linkage use projections 31d and 31e at only the first layer sheet member 31, there is also the disadvantage that gaps are easily generated in the overlay parts of the passageway blocking parts 31b to 34c at the intermediate operation position of the multilayer sliding door 30.

Third Embodiment

The third embodiment relates to a specific example of application of the air passageway opening/closing devices according to the first and second embodiments to an automotive air-conditioning system.

Figure 9:
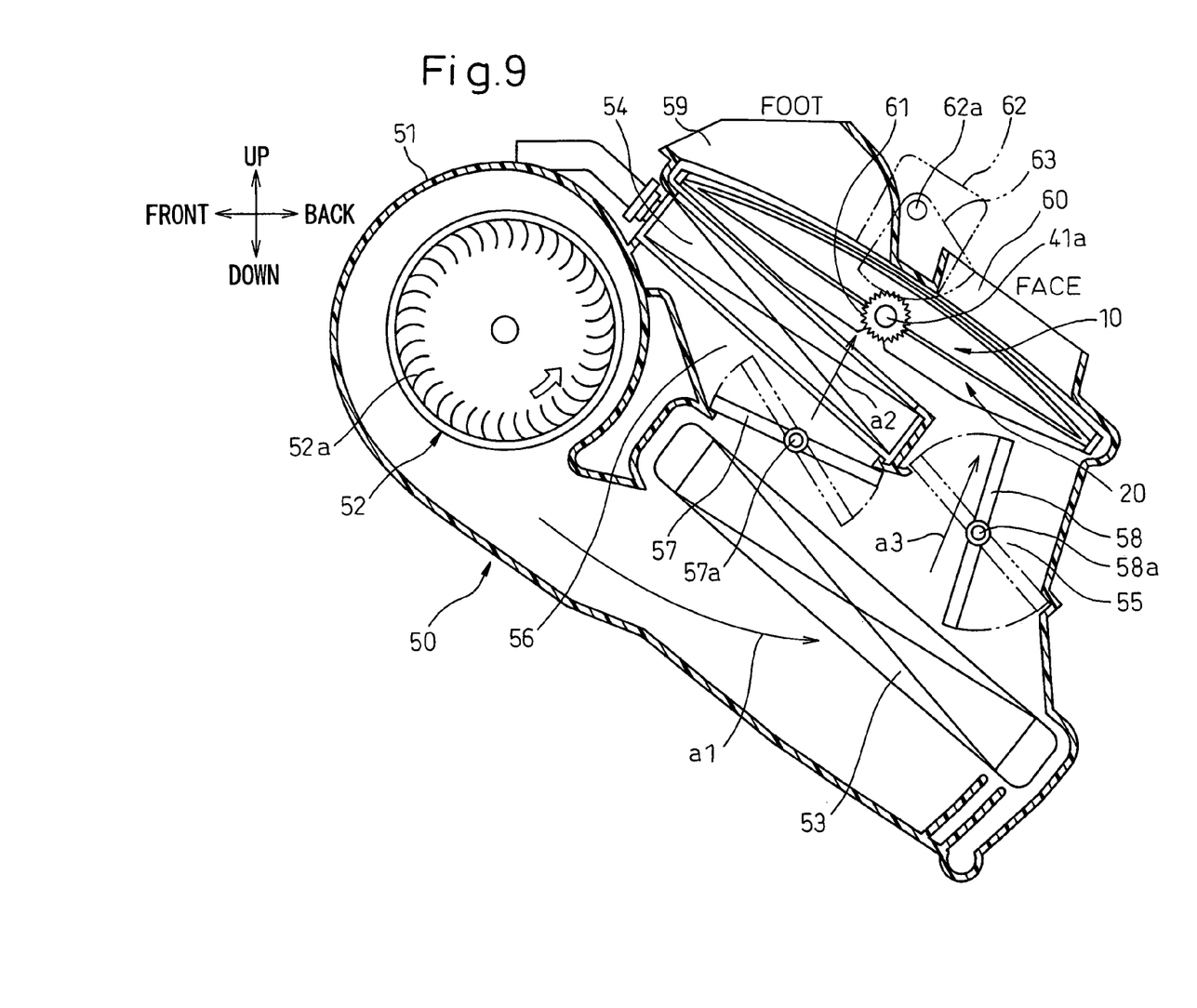
FIG. 9 is a cross-sectional view of an automotive air-conditioning cabin unit showing a third embodiment of the present invention.

FIG. 9 shows an in-cabin air-conditioning unit 50 of an automotive air-conditioning system according to the third embodiment. The upward, downward, forward, and rearward arrows in FIG. 9 indicate directions in the state mounted in an automobile.

This in-cabin air-conditioning unit 50 is for air-conditioning the rear seat section in the cabin. This rear seat in-cabin air-conditioning unit 50 is mounted on for example the walls of the body on the left and right of the rear seat section in the cabin in a van type vehicle.

The in-cabin air-conditioning unit 50 is provided with an air-conditioning casing 51 made of plastic and forming passageways for the air flowing toward the interior of the cabin. This air-conditioning casing 51 is actually formed as a plurality of casing sections for convenience in plastic forming, for convenience of assembly of internal components, etc. By joining the plurality of casing sections by fastening means such as screws and clips, the air-conditioning casing 51 is constructed. The air-conditioning casing 51 is constructed by a left casing section and a right casing section obtained by dividing the casing to the left and right direction of the vehicle (direction vertical to the sheet surface of FIG. 9) in the present example.

Then, in the air-conditioning casing 51, an air-blower unit 52 having a centrifugal air fan 52a is integrally arranged at the top of the front side of the vehicle. The air inside the cabin (inner air) is sucked in by this blower unit 52 and blown toward an evaporator 53 as indicated by an arrow a1. The evaporator 53 is a cooling use heat exchanger for cooling the blown air.

In the air-conditioning casing 51, a heater core 54 is arranged on the downstream side (upstream side) of the air flow of the evaporator 53 and the forward side of the vehicle. This heater core 54 is a heating use heat exchanger for heating the air (cool air) passed through the evaporator 53 by hot water (engine cooling water). An arrow a2 shows the flow of the warm air heated by the heater core 54.

Then, in the air-conditioning casing 51, a cool air passageway 55 is formed at a position on one end of the heater core 54 (rearward side of the vehicle). This cool air passageway 55 is a passageway in which an air (cool air) a3 passed through the evaporator 53 flows by bypassing the heater core 54.

In the air-conditioning casing 51, in the warm air passageway 56 in which the air flows after passing through the heater core 54, the warm air side air mix door 57 is rotatably provided with a shaft 57a. This warm air side air mix door 57 adjusts the opening degree of the warm air passageway 56 to adjust the amount of the warm air a2 heated by the heater core 54.

In the cool air passageway 55, the cool air side air mix door 58 is rotatably provided with a shaft 58a. This cool air side air mix door 58 adjusts the opening degree of the cool air passageway 55 to adjust the amount of the cool air a3 passing through the cool air passageway 55.

Note that the two air mix doors 57 and 58 are operated in linkage by a common door drive mechanism (not illustrated) so that the amount of the cool air a3 is reduced when the amount of the warm air a2 increases and conversely the amount of the warm air a2 is reduced when the amount of the cool air a3 increases.

A rear seat foot vent passageway 59 is arranged above the heater core 54 at the top surface of the air-conditioning casing 51, while a rear seat face vent passageway 60 is arranged above the cool air passageway 55 at the top surface of the air-conditioning casing 51. Accordingly, the two vent passageways 59 and 60 are arranged adjacent in the front and rear direction of the vehicle.

In the third embodiment, a vent mode switch door for switching the air flow of this rear seat foot vent passageway 59 and rear seat face vent passageway 60 is constructed by an air passageway opening/closing device using a multilayer sliding door 30 (not illustrated in FIG. 9) according to the first and second embodiments.

Namely, in the air-conditioning casing 51, the integral assembly of the first and second housings 10 and 20 having the multilayer sliding door 30, the drive mechanism 40 (not illustrated in FIG. 9), etc. (air passageway opening/closing device) is arranged at a position immediately in front of the vent passageways 59 and 60. The integral assembly of these first and second housings 10 and 20 is sandwiched and fixed between the left casing section and the right casing section of the air-conditioning casing 51.

The first air passageway 11 of the first housing 10 is connected to for example the rear seat face vent passageway 60, while the second air passageway 12 of the first housing 10 is connected to for example the rear seat foot vent passageway 59.

The projecting end 41a of the drive shaft 41 for driving the multilayer sliding door 30, in the example of FIG. 9, is integrally provided with the connection use gear 61. A fan shaped gear 63 provided integrally with an output shaft 62a of the servo motor 62 forming the door drive source is meshed with this connection use gear 61. Due to this, the rotation output of the servo motor 62 is transmitted to the drive shaft 41 via the meshing of the fan shaped gear 63 and the connection use gear 61 and operates the multilayer sliding door 30.

In the rear seat in-cabin air-conditioning unit 50 for air-conditioning the rear seat section of the cabin, as the vent mode, usually a face mode opening only the rear seat face vent passageway 60, a bi-level mode opening both of the rear seat face vent passageway 60 and the rear seat foot vent passageway 59, and a foot mode opening only the rear seat foot vent passageway 59 are switched.

Accordingly, as the operation position of the multilayer sliding door 30, the state of FIG. 6(1) (face mode state), the state of FIG. 6(3) (high level mode state), and the state of FIG. 6(5) (foot mode state) may be selected.

Note that, in the third embodiment, the vent mode switch door is constructed by the air passageway opening/closing device using the multilayer sliding door 30, but the air mix door adjusting the ratio of the amount of the warm air a2 and the amount of the cool air a3 may also be constructed by the air passageway opening/closing device using the multilayer sliding door 30. That is, a single air mix door performing both roles of the warm air side air mix door 57 and the cool air side air mix door 58 may also be constructed by the air passageway opening/closing device using the multilayer sliding door 30.

Specifically, one of the first air passageway 11 and the second air passageway 12 of the first housing 10 is connected to the cool air passageway 55, and the other is connected to the warm air passageway 56.

Then, for the control of the temperature of the air vented into the cabin, the adjustment of the ratio of the amounts of the warm air a2 and the cool air a3 must be carried out in as many stages as possible. Therefore, the operation position of the multilayer sliding door 30 is adjusted finer in a larger number of stages than the five stages shown in FIG. 6.

Even when using the multilayer sliding door 30 of the present invention to construct the air mix door in this way, the phenomenon of separation of the cold air and warm air mentioned before is eliminated, the mixing property of the cold air and warm air is improved, and the temperature controllability of the air blown into the cabin is improved.

Other Embodiments (1) In the first embodiment, the passageway blocking part lengths X of the first layer to fourth-layer sheet members 31 to 34 were successively made smaller from the first layer side to the fourth layer side by fine amounts corresponding to the thickness t of the linkage use projections 31d to 33e, and the front end positions of the first layer to fourth layer sheet members 31 to 34 were made uniform to the same position, but the passageway blocking part lengths X of the first layer to fourth layer sheet members 31 to 34 may also be set to the same dimensions.

When the passageway blocking part lengths X are made the same dimensions, the front end positions of the first layer to fourth layer sheet members 31 to 34 will be offset by fine amounts corresponding to the thickness t of the linkage projections 31d to 33e, but this positional deviation is very small and therefore does not obstruct practical use.

That is, the "substantially the same position" in the second aspect of the present invention includes not only the case of the same position, but also positional deviation of a fine amount corresponding to the thickness t of the linkage projections 31d to 33e.

(2) In the first embodiment, the sheet members 31 to 34 were made of plastic, but the sheet members 31 to 34 may be constructed by iron or other metal sheets as well. In the cases of the sheet members 31 to 34 made of metal, the linkage projections 31d to 33e can be shaped by bending.

(3) In the first embodiment, as the linkage means for linking the plurality of sheet members 31 to 34, the projections 31d to 33e were provided at the ends of the openings 31a to 33a of the first to third layer sheet members 31 to 33 in the direction of door movement b, but the linkage means is not limited to only such projections 31d to 33e.

For example, it is also possible to form engagement use recesses having lengths in the direction of door movement b successively becoming larger from the second layer toward the fourth layer at the left and right side surfaces (surfaces parallel to the direction of door movement b) of the second layer to fourth layer sheet members 32 to 34 and, at the same time, provide projections projecting into the engagement recesses of the adjacent larger sheet members at the left and right side surfaces of the first layer to third layer sheet members 31 to 33 so as to construct linkage means performing the same role as that of the first embodiment.

(4) In the first and second embodiments, the example of superposing four sheet members 31 to 34 was explained, but the number of the sheet members 31 to 34 can be increased or decreased according to need. Two sheet members may be set as the smallest number of the sheet members 31 to 34.

(5) In the third embodiment, an automotive air-conditioning system was explained as a specific example of application of the present invention, but the present invention is not limited to an automotive air-conditioning system and can be widely applied to air passageway opening/closing devices for various purposes.

While the invention has been described by reference to specific embodiments chosen for the purposes of illustration, it should be apparent that numerous modifications could be made thereto by those skilled in the art without departing from the basic concept and scope of the invention.

The invention claimed is:

1. An air passageway opening/closing device provided with:
    two adjacent air passageways and
    door means moving in a direction of arrangement of the two air passageways for opening/closing the two air passageways, wherein
    the door means is constructed by a plurality of sheet members superposed in a direction of flow of air in the two air passageways;
    the plurality of sheet members have openings for being aligned with at least one of the two air passageways to open the at least one of the two air passageways and passageway blocking parts located on two sides of the direction of door movement of the openings;
    outside dimensions in the direction of door movement of the plurality of sheet members and the lengths in the direction of door movement of the openings differ from each other by predetermined amounts;
    as soon as a smaller sheet member among the plurality of sheet members has moved in the direction of door movement by a predetermined amount, the smaller sheet member and an adjacent larger sheet member start to move together;
    opening ranges of each of the two air passageways are determined by only a position of movement of the opening of the smallest sheet member, and blocking ranges of the two air passageways are determined by superposing the passageway blocking parts of the plurality of sheet members in a stepwise offset state; and
    a drive force in the direction of door movement is applied only to the smallest sheet member among the plurality of sheet members.

2. An air passageway opening/closing device as set forth in claim 1, a linkage means for moving said adjacent two sheet members is provided in the smaller sheet member.

3. An air passageway opening/closing device as set forth in claim 2, wherein the linkage means is comprised of projections projecting from the two front and rear ends of the opening in the direction of door movement of the opening of the smaller sheet member to the inside of the opening of the larger sheet member.

4. An air passageway opening/closing device as set forth in claim 1, wherein the plurality of sheet members are successively superposed from the smallest member to the largest member from an upstream side toward a downstream side of the flow of air.

5. An air passageway opening/closing device as set forth in claim 4, wherein three or more of the plurality of sheet members are successively superposed from a smaller to a larger member for reducing the size.

6. An air passageway opening/closing device as set forth in claim 4, wherein
    provision is made of a housing forming the two air passageways,
    a largest sheet member among the plurality of sheet members contacts a sealing surface at which upstream ends of the two air passageways open in the housing, and
    the sealing surface is formed to an arc shape projecting outward toward the downstream side of the air flow.

7. An air passageway opening/closing device as set forth in claim 6, wherein provision is made of
    a driven gear formed so as to extend in the direction of door movement at a circumferential edge of the opening of the smallest sheet member and
    a drive shaft having a drive gear meshed with the driven gear, a driving force in the direction of door movement is applied to the smallest sheet member by the rotation of the drive shaft, the sheet members other than the smallest sheet member among the plurality of sheet members are previously shaped to arc shapes having larger radii of curvature than the arc shaped sealing surface or flat shapes, and the other sheet members are elastically deformed by a pressing force from the drive shaft side and are pushed against the arc-shaped sealing surface.

8. An air passageway opening/closing device as set forth in claim 6, wherein provision is made of a driven gear formed so as to extend in the direction of door movement at a circumferential edge of the opening of the smallest sheet member and a drive shaft having a drive gear meshed with the driven gear, and a driving force in the direction of door movement is applied to the smallest sheet member by the rotation of the drive shaft.

9. An air passageway opening/closing device as set forth in claim 1, wherein provision is made of a first housing forming the two air passageways, a second housing facing the first housing, and a drive mechanism applying a driving force in the direction of door movement to the smallest sheet member, the plurality of sheet members and the drive mechanism are sandwiched inside the first housing and the second housing, and the plurality of sheet members, the drive mechanism, and the first and second housings are combined as a single assembly.

10. An air passageway opening/closing device as set forth in claim 1, wherein two adjacent sheet members are shaped by materials different from each other.

11. An automotive air-conditioning system provided with an air passageway opening/closing device as set forth in claim 1, wherein the two air passageways are connected to air vent passageways for venting air into different portions in a cabin, and the air flows of the two air vent passageways are switched by the air passageway opening/closing device.

12. An automotive air-conditioning system provided with an air passageway opening/closing device as set forth in claim 1, wherein provision is made of a heating use heat exchanger for heating air flowing toward the interior of a cabin, a warm air passageway through which warm air passed through the heating use heat exchanger flows, and a cool air passageway through which cool air flows bypassing the heating use heat exchanger, one of the two air passageways is connected to the warm air passageway, the other of the two air passageways is connected to the cool air passageway, and the opening degree of the warm air passageway and the opening degree of the cool air passageway are adjusted by the air passageway opening/closing device.

* * * * *

UNITED STATES PATENT AND TRADEMARK OFFICE
CERTIFICATE OF CORRECTION

PATENT NO.       : 7,431,638 B2                                    Page 1 of 1
APPLICATION NO.  : 11/223598
DATED            : October 7, 2008
INVENTOR(S)      : Takuya Natsume et al.

It is certified that error appears in the above-identified patent and that said Letters Patent is hereby corrected as shown below:

Col. 21, line 12, claim 8, "claim 6" should be --claim 4--

Signed and Sealed this

Twenty-fourth Day of March, 2009

JOHN DOLL
*Acting Director of the United States Patent and Trademark Office*